United States Patent [19]

Lowther

[11] Patent Number: 5,300,152

[45] Date of Patent: Apr. 5, 1994

[54] METHOD OF CLEANING TUBULAR WITH FROZEN LAYERED GELATIN PIG

[75] Inventor: Frank E. Lowther, Plano, Tex.

[73] Assignee: Atlantic Richfield Company, Los Angeles, Calif.

[21] Appl. No.: 919,323

[22] Filed: Jul. 27, 1992

[51] Int. Cl.$^5$ .............................................. B08B 9/04
[52] U.S. Cl. ..................................... 134/8; 134/22.11
[58] Field of Search ........................... 134/8, 7, 22.11; 15/104.061

[56] References Cited

U.S. PATENT DOCUMENTS 4,473,408  9/1984  Purinton, Jr. ........................... 134/8
4,898,197  2/1990  Barry et al. ............................ 134/8

OTHER PUBLICATIONS

Kirk-Othmer, Encyclopedia of Chemical Technology, vol. 11, J. Wiley & Sons, N.Y. pp. 711-715 1986.

The Theory of the Photographic Process, 3rd Edition, The MacMillan Company, N.Y. pp. 45-60 1980.

Primary Examiner—R. Bruce Breneman
Assistant Examiner—Saeed Chaudhry
Attorney, Agent, or Firm—Drude Faulconer

[57] ABSTRACT

A method and gelatin pig is provided for scraping and cleaning tubulars. The gelled, cleaning pig has a body comprised of gelled material, preferably technical gelatin, which has a hardened, frozen outer layer. The pig is molded in a size sufficient for the periphery of the body to contact the interior wall of the tubular to be cleaned. The frozen outer surface of the gelatin is formed by merely exposing the outer surface of the gelatin to (1) the atmosphere if the ambient temperature is above the freezing temperature of the gelatin or (2) artifical refrigeration. In operation, the gelatin pig is inserted into and passed through the pipeline to scrap and clean same. The gelatin pig is bio-degradable which can be accelerated by adding a bio-reactive agent, e.g. yeast, to the gelatin.

9 Claims, No Drawings

METHOD OF CLEANING TUBULAR WITH FROZEN LAYERED GELATIN PIG

DESCRIPTION

1. Technical Field

The present invention relates to the scraping and cleaning of tubulars and in one of its aspects relates to a method wherein a gelled pig is passed through the tubular to scrap and clean the tubular wherein the pig has a body which is formed of common gelatin which, is frozen on its outer surface to form a hardened layer thereon.

2. Background Art

As is known in the art, the interior of most tubulars, e.g. pipelines, should be cleaned after construction and periodically during operation to remove scale and debris to thereby achieve and maintain high flow efficiencies therethrough. For example, in pipelines such as those used for transporting crude oil and/or natural gas, it is common for substantial amounts of sand, rust, weld slag, and other debris to accumulate in the line during construction. Further, these pipelines periodically experience substantial losses in flow efficiencies during their operational lives due to (1) scale buildup on the interior wall of the pipe and/or (2) the accumulation of solid materials (e.g. sand, debris, asphaltenes, etc.) which are deposited in the line from the fluids flowing therethrough. As recognized by the art, it is desirable, if not mandatory, to remove this scale and debris from the line at regular maintenance intervals or when a substantial loss in flow efficiency is detected.

There are several known techniques for removing scale and/or debris from such tubulars. These include the use of high velocity, turbulent flow through the pipeline, mechanical scrapers, and/or gelled plugs or pigs to remove the debris from the pipe. While each of these techniques have experienced success, each has some apparent disadvantages. For example, most pipelines simply do not have the pumping capacity required to generate high enough flow velocities to generate the turbulence required to adequately clean the scale and debris out of the pipeline. To so equip most pipelines would be economically infeasible.

Mechanical pigs or scrapers have been widely used for scaping and cleaning pipelines. A typical mechanical scraper is comprised of a solid, piston-like body having wire brushes or abrasive surfaces thereon which physically abrade or "scrap" the scale off the interior of the pipe as the scraper is pushed through the pipe by fluids flowing therethrough. The scale and other debris in the pipe is pushed through the line ahead of the scraper. Unfortunately, this debris is likely to continue to build-up ahead of the scraper until debris bypasses the scraper where it remains in the line. Still further, the debris accumulating ahead and around the scraper may cause the scraper to become stuck in the pipe thereby requiring the line to be cut in order to remove the scraper before flow can be resumed in the line. In addition to the disadvantages set forth above, mechanical scrapers are also costly and time-consuming to use in that expensive and cumbersome "launchers" and "catchers" must be installed in the pipeline to be cleaned.

Gelled pigs, comprised of a variety of different compositions, have been used in pipelines to remove debris therefrom. These pigs, sometimes referred as "debris pick-up gelled pigs", are passed through a line to pick-up and entrain debris so it can be carried out of the line with the pig. Unfortunately, however, many of these gels either (1) functon much like a mechanical scrapper in that debris, as it builds-up ahead of the pig, may bypass the gelled pig and be left in the pipe or (2) function like fluids which require high flow rates to produce the turbulence necessary to suspend and carry the debris from the pipe. Further, it is not uncommon for the fluids flowing through the pipeline to react with the gel forming the pig to dilute and/or cause disintegration of the pig before it achieves its objective.

As mentioned above, several different types of actual compositions have been used or proposed for forming the known gelled, cleaning pigs. Such compositions include (1) aqueous gels such as aqueous, cross-linked gelled galactomannan gum or derivates thereof (see U.S. Pat. No. 4,543,131); (2) a monpolar, liquid, organic solvent combined with a gelling mixture of alkyl oleyl phosphate and an alkali metal aluminate (see U.S. Pat. No. 4,473,408); (3) Bingham plastic pigs formed from (a) mineral oil and organo-modified smectite with powered coal, or (b) water and zanthan gum which may be cross-linked with a multivalent metal (see U.S. Pat. Nos. 4,216,026 and 4,416,703); and (4) a variety of other compositions, e.g., see the background discussions of the prior art in each of the above-identified patents.

While a mechanical pig "launcher" and "catcher" are not needed to launch or catch a gelled pig, nevertheless, such launchers and catchers may still be required in most, if not all, known cleaning operations using such pigs. That is, in most pipe-cleaning operations which use gelled pigs, a mechanical scraper is still required to "push" the gelled pig through the line since the gelled pig does not normally have sufficient consistency to move through the pipeling as a unitary mass on its own. Without a mechanical scraper to push the gelled pig through the line, it is likely to react with the fluids in the line and break up or disintegrate thereby allowing debris to easily bypass the pig.

In the present inventor's co-pending U.S. patent application Ser. No. 07/896,634 filed Jun. 10, 1992, there is disclosed a gelled pig formed of gelatin for cleaning tubulars wherein the gelatin pig has an hardened layer on its outer surface. This layer may be formed by (1) exposing the pig to the air for a time sufficient to dehydrate the outer surface of the body of the gelatin pig and thereby form a hardened layer having a desired thickness or (2) applying a hardener, e.g. aldehyde, to the surface in an amount sufficient to form an hardened layer of a desired thickness.

SUMMARY OF THE INVENTION

The present invention provides a method for scraping and cleaning tubulars and a gelled pig for use in said method. The gelled pig has a body comprised of gelled material, preferably gelatin, which has a firm, hardened layer or skin on its outer surface, similar to that disclosed in co-pending U.S. application Ser. No. 07/896,634, filed Jun. 10, 1992, wherein the hardened layer of the present pig is formed by freezing the outer surface of the body of gelled material to a desired depth. The pig is molded in a size which is sufficient for the periphery of the body (i.e. outer surface) to contact the interior wall of a tubular to be cleaned when the pig is inserted and passed through the tubular.

More specifically, the cleaning, gelled pig of the present invention is preferably comprised of a body formed of technical "gelatin" which has been gelled and frozen about its outer surface to form a firm, frozen layer or skin thereon. "Gelatin" as used herein, refers only to the highly-branched, high molecular weight polypeptides derived from collagen.

The pig is formed by mixing technical gelatin (i.e. gelatin derived from collagen) with a liquid, e.g. water, which has been heated to about 170° F. or above. The gelatin-hot liquid mixture is poured into an appropriate mold where it is allowed to cool to ambient temperature (e.g. a temperature less than about 100° F.) to thereby form a gelatin pig in basically in the shape of the mold which has the dimensions necessary to form a pig having a size sufficient for the periphery of the pig to contact the interior wall of the pipe which is to be cleaned by that particular pig.

While the pig is in the mold or after it has been removed therefrom, the outer surface of the gelled material is frozen to form a firm outer layer or skin on the pig. This can be done by merely exposing the outer surface of the gelatin pig (1) to the atmosphere if the ambient temperature is below the freezing point of the gelled material or (2) to artifical refrigeration for the period of time sufficient to form a frozen, firm outer layer having a desired thickness (e.g. at least about ¼ inch).

In operation, a cleaning, gelled pig having a frozen outer layer thereon is formed and then inserted into the pipeline to be cleaned. The fluids flowing through the pipeline forces the pig therethrough. The frozen, hardened outer layer of the gelled pig contacts the pipewall to thereby "scrap" scale therefrom as the body of the pig pushes the scale and other debris ahead in the line. The body of the gelled, cleaning pig has sufficient compliancy to easily negotiate through the line and has sufficient consistency so that no mechanical scraper is required to push it through the line thereby eliminating the need for any mechanical pig launchers in the pipeline. Further, since the gelled pig will disintegrate after it passes through the line and the outer layer melts, no pig catcher is required. In the case of the preferred gelatin pig, it will disintegrate due to bio-degradation. To accelerate the bio-degradation of the pig, a bio-reactive agent, e.g. yeast, may be added to the gelatin-liquid mix before it is cooled in the mold.

BEST KNOWN MODE FOR CARRYING OUT THE INVENTION

In accordance with the present invention, a method and a gelled pig for use in the method is provided for scraping and cleaning tubulars. The gelled pig has a body comprised of a gelled material, preferably gelatin, which has a firm, frozen layer or skin on its outer surface. The pig is molded in a size which is sufficient for the periphery of the body to contact the interior wall of a tubular to be cleaned when the pig is inserted in and passes through the tubular. As used herein, "tubular" is intended to include any pipe or conduit through which materials (e.g. liquids, gases, etc.) are flowed. While the present invention will be described primarily in relation to a substantially horizontal pipeline which carries crude oil, natural gas, and/or like hydrocarbon products, it can also be used for scraping and cleaning substantially vertical, inclined, and/or horizontal tubulars such as well casings and tubings.

In the present invention, the cleaning, gelled pig is a semi-solid, gelled plug or "pig" which is preferably comprised of a body formed of common "gelatin" which has been frozen about its outer surface to form a firm, hardened layer or skin thereon. This layer contacts the interior wall of the pipeline as the pig passes therethrough to remove scale or the like therefrom as the body of the pig pushes the scale and other debris ahead through the line Gelatin is a material which is capable of recovering from large deformations quickly and forcibly which allows the pig to easily negotiate bends, constrictions, and the like in the pipeline and has been used to form gelled pigs for treating tubulars to inhibit corrosion, reduce drag, etc.; see copending U.S. patent application 07/683,164, filed Apr. 10, 1991, and commonly assigned herewith.

As is well known and as used herein, "gelatin(s)" is a specific term of art which refers only to highly-branched, high molecular weight polypeptides derived from collagen which, in turn, is the primary protein component of animal connective tissue (e.g. bones, skin, hides, tendons, etc.). Gelatin—sometimes specifically referred to as "technical" or "common" gelatin and commonly used in foods (highly refined), glues (lesser refined), photographic and other products—does not exist in nature but is a hydrolysis product obtained by hot water extraction from the collageous raw material after it has been processed with acid, alkaline, or lime. The viscosity of aqueous gelatin solutions increases with increasing concentrations and decreasing temperatures. For a more complete description and discussion of gelatin, its compositions and properties, see ENCYCLOPEDIA OF CHEMICAL TECHNOLOGY, Kirk-Othmer, 3rd Edition, Vol. 11, J. Wiley & Sons, N.Y., pps. 711 et sec.

In formulating a pig in accordance with the present invention, technical gelatin (i.e. gelatin derived from collagen) is mixed with a liquid and heated. Technical gelatin will form a solution with almost any liquid except raw, uncooked pineapple juice, and the hardness (i.e. firmness) of a gelled mass of gelatin is primarily dependent on the amount of gelatin used and is relatively independent of the liquid used to form the gelatin mixture. Preferably, in the present invention, the gelatin is mixed with water which has been heated to about 170° F. or above to form a gelatin mixture. The actual amount or concentration of technical gelatin in any particular gelatin mixture can vary over a wide range (e.g. from about 2% to about 90%) depending on the particular cleaning operation to be carried out.

The gelatin-hot liquid mixture is poured into an appropriate mold where it is allowed to cool to ambient temperature (e.g. room temperature) to thereby form a gelatin pig in basically in the shape of the mold, e.g. an elongated cylinder. Of course the mold will have the desired dimensions necessary to produce a pig which will have a size sufficient for the periphery of the pig to contact the interior wall of the pipe in which the pig is to be used. In practice, the diameter of the gelled, gelatin pig may actually be slightly larger or smaller than the diameter of the pipeline which is to be scraped and cleaned as is explained below.

If the diameter of the pig is larger, due to the compliancy of the gelatin, the pig will be compressed when inserted into the pipeline thereby providing an additional outward bias which aids in maintaining the periphery of the pig against the wall of the pipeline as the pig moves therethrough. The pressure from the fluids being pushed ahead of the pig will act on the leading face of the pig while the pressure of the fluids pushing the pig will act on its rear to compress the pig along its longitudinal axis to continuously force the periphery of gelatin pig into contact with the pipewall at all times, even if material should wear off the pig. This is true regardless whether the diameter of the pig is smaller, larger, or approximately the same as the diameter of the pipeline so that the pig will continue to maintain contact with the wall during the entire cleaning operation.

While the pig is in the mold or after it has been removed therefrom, the outer surface of the gelled gelatin is hardened to form a firm outer layer or skin on the pig. This can be done by merely exposing the outer surface of the gelatin pig to (1) the atmosphere if the ambient temperature is above the freezing point of the gelatin (e.g. $-5°$ C., common in Arctic environs) or (2) freezing temperatures created by artifical refrigeration for a period of time sufficient to form a hardened, firm frozen layer having a desired thickness or depth into the body (e.g. at least about ¼ inch). As will be understood, the longer the pig is exposed to the freezing conditions, the thicker the hardened layer becomes.

While the frozen layer on the gelatin body of the pig will contact the internal pipe wall as the pig moves through the pipeline to provide a scraping action for removing scale from the pipewall, it is not so firm as to substantially interfer with the compliancy of the pig which is provided by the unexposed gelatin forming the inner body of pig. Also, while the outer layer will undergo some melting as it moves through the line, the layer is sized so that the pig will travel the length of tubular to be cleaned before the layer fully melts.

In operation, a cleaning, gelled gelatin pig having a hardened outer layer thereon is formed as set forth above. The pig is then inserted into the pipeline and is moved therethrough by the fluids flowing in the pipeline Due to the compliancy of the unfrozen gelled material body of the pig, the hardened, frozen outer layer remains in contact with the pipewall as the pig moves through the line and "scraps" scale therefrom as the pig picks-up and/or pushes the scale and debris ahead in the line. Even if some of the frozen layer melts or abrades as it scraps against the pipewall, the remaining, now-roughened layer still functions to clean the pipe.

By using the gelled cleaning pig of the present invention, no mechanical scraper is required thereby eliminating the need for expensive mechanical pig launchers in the pipeline. Further, since the gelled pig will disintegrate after it has passed through the pipeline and the outer layer has melted, there is no need to install a mechanical pig catcher in the pipeline since the disintegrated gelatin merely flows out of the line with the pipeline fluids and debris.

In the preferred pig which is formed of gelatin, the pig will bio-degrade after a period of time. To make sure that a gelatin cleaning pig will be sufficiently bio-degraded and disintegrated after reaching its final destination, a bio-reactive agent may be added to the gelatin-liquid mix before it is cooled in the mold to ultimately accelerate the rate of bio-degradation. The bio-reactive agent may be selected from certain enzymes, e.g. peptic enzymes, or from certain fungi, e.g. yeast. The following are the results of a test which show the bio-degradation effects that respective quantities of common baker's yeast (Fleischmann Dry Super Yeast) have on a particular gelatin composition:

| Sample No. | Water | Gelatin | Yeast |
| --- | --- | --- | --- |
| 1 | 95 grams | 15 grams | 0.0 grams |
| 2 | 95 grams | 15 grams | 4.0 grams |
| 3 | 95 grams | 15 grams | 0.4 grams |
| 4 | 95 grams | 15 grams | 0.04 grams |

The samples were made up and allowed to gel and each was placed in a separate 500 ml plastic container with a loose fitting cover. Each container was then placed in an oven at a constant 83° F. and left for approximately 76.5 hours, after which the following observations were made:

Sample No. 1 No apparent change in hardness, slight odor.
Sample No. 2 Almost completely disintegrated, fibrous mold, yeasty odor.
Sample No. 3 Somewhat softened, yeasty odor
Sample No. 4 Same as No. 1 except yeasty odor.

It can be seen from the above that the amount of bioreactive agent can be varied in relation to the size of a particular pig and the time estimated for the pig to carry out its cleaning function in a particular pipeline so that the pig will not substantially bio-degrade until after it reaches its destination.

What is claimed is:

1. A method for cleaning a tubular comprising:
passing a gelled, cleaning pig through said tubular wherein said pig contacts the interior wall of said tubular to remove scale and push said scale and other debris ahead through said tubular, said cleaning pig comprising:
a body of gelled material having an frozen layer on its outer surface and having a size sufficient for the periphery of said body to contact the interior wall of said tubular when said pig is positioned in and passes through said tubular; wherein said body of gelled material is formed from a mixture of (a) common gelatin of the type derived from collagen and (b) a heated liquid which is then allowed to cool ambient temperature.

2. The method of claim 1 wherein said gelled material comprises:
gelatin.

3. The method of claim 2 wherein said heated liquid is at a temperature of about 170° F. and said ambient temperature is less than about 100° F.

4. The method of claim 3 wherein said heated liquid comprises:
water.

5. The method of claim 3 wherein said pig is formed by allowing the gelatin-heated liquid mixture to cool in a mold having the dimensions necessary to form a pig to be used in a particular tubular 6. The method of claim 3 wherein said frozen outer layer is at least about ¼ inch thick.

7. The method of claim 3 wherein said frozen outer layer is formed by exposing said body of gelatin to a freezing temperature for a time sufficient to form a hardened layer of a desired thickness.

8. The method of claim 3 including:
a bio-reactive agent in said body of gelled gelatin to react with said gelatin and accelerate bio-degradation of said gelatin.

9. The method of claim 8 wherein said bio-reactive agent comprises:
yeast.

* * * * *